United States Patent [19]

Suzuki et al.

[11] Patent Number: 4,758,037
[45] Date of Patent: Jul. 19, 1988

[54] MOVABLE FRONT SPOILER DEVICE FOR AUTOMOTIVE VEHICLE

[75] Inventors: Hiroshi Suzuki; Masaharu Matsumoto, both of Yokohama; Tsuguhiro Yamada, Yokosuka, all of Japan

[73] Assignee: Nissan Motor Company, Limited, Yokohama, Japan

[21] Appl. No.: 844,509

[22] Filed: Mar. 27, 1986

[30] Foreign Application Priority Data

Mar. 29, 1985 [JP] Japan ................................. 60-63763

[51] Int. Cl.⁴ ............................................. B62D 37/02
[52] U.S. Cl. ..................................................... 296/1 S
[58] Field of Search ................... 296/1 S, 91; 293/118, 293/119; 180/903

[56] References Cited

U.S. PATENT DOCUMENTS

| | | | |
|---|---|---|---|
| 3,618,998 | 11/1971 | Swauger | 296/1 S |
| 4,119,339 | 10/1978 | Heimburger | 296/1 S |
| 4,398,764 | 8/1983 | Okuyama | 296/1 S |
| 4,457,558 | 7/1984 | Ishikawa | 296/1 S |
| 4,489,806 | 12/1984 | Shimomura | 296/1 S X |

FOREIGN PATENT DOCUMENTS

| | | |
|---|---|---|
| GM7906193 | 5/1979 | Fed. Rep. of Germany . |
| 3145258A1 | 5/1983 | Fed. Rep. of Germany . |
| 59-156875 | 9/1984 | Japan . |

Primary Examiner—Robert B. Reeves
Assistant Examiner—Russell D. Stormer
Attorney, Agent, or Firm—Foley & Lardner, Schwartz, Jeffery, Schwaab, Mack, Blumenthal & Evans

[57] ABSTRACT

A front spoiler device is capable of moving steadily between active and retracted positions. The front spoiler device, according to the present invention, has an elongated front spoiler member extending across the entire width of the front end of the vehicle body. The front spoiler member is supported from the vehicle body by a plurality of guide assemblies which guide vertical movement of the spoiler member. The guide assemblies are spaced apart from each other so as to support the spoiler both at its center and at its opposite ends.

9 Claims, 7 Drawing Sheets

FIG. 11

MOVABLE FRONT SPOILER DEVICE FOR AUTOMOTIVE VEHICLE

BACKGROUND OF THE INVENTION

The present invention relates generally to an air spoiler device for an automotive vehicle which can be moved at least between active and retracted positions. More specifically, the invention relates to a front spoiler device for an automotive vehicle which reduces the air flow beneath the vehicle body so as to reduce the lift applied to the vehicle. More specifically, the invention relates to a mechanism which raises and lowers a front spoiler member while holding it steady horizontally.

As is well known, a front spoiler reduces air flow beneath a vehicle body and whereby reduces the lift on the vehicle. Front spoilers are particularly valuable for ensuring vehicle stability when the vehicle is moving at relatively high speed. On the other hand, when the vehicle is travelling at relatively low speeds, a front spoiler merely adds to wind resistance, thus degrading fuel economy. Furthermore, on city streets, the front spoiler would tend to strike projections such as curbs and so be damaged.

Therefore, it would be beneficial to provide a movable front spoiler which can be moved to an active position, in which it projects downward from the bottom of the front end of the vehicle body, while the vehicle speed is relatively high and to a retracted position, in which it is concealed within the vehicle body, while the vehicle speed is relatively low. Since the front end of the vehicle is subjected to significantly high air pressure when the vehicle is moving, particularly when moving at high speed, it is necessary to hold the front spoiler in place and to shift the front spoiler member up and down securely.

SUMMARY OF THE INVENTION

Therefore, it is an object of the present invention to provide a front spoiler device capable of moving steadily between active and retracted positions.

Another object of the invention is to provide a mechanism for supporting and shifting a front spoiler member up and down steadily.

In order to accomplish the aforementioned and other objects, a front spoiler device, according to the present invention, has an elongated front spoiler member extending across the entire width of the front end of the vehicle body. The front spoiler member is supported from the vehicle body by means of a plurality of guide assemblies which guide vertical movement of the spoiler member. The guide assemblies are spaced apart from each other so as to support the spoiler both at its center and at its opposite ends.

In the preferred construction, each of the guide assemblies include a guide member, and a movable stay member movable along the guide member and fitted to a corresponding part of the spoiler member. The movable stay members are designed to move up and down together.

A movable front spoiler device for an automotive vehicle comprises an elongated front spoiler member extending along the lower edge of the front end of the vehicle, a plurality of guide means, associated with the front spoiler member, for guiding movement of the front spoiler member between an active position wherein the front spoiler member is projects downward from the lower edge of the front end of the vehicle, and a retracted position wherein the front spoiler member is retracted behind the front end of the vehicle, at least one of the guide means being arranged to supportingly guide movement of the front spoiler member at the central portion of the front spoiler member and at least two other guide means being arranged to supportingly guide the opposite ends of the front spoiler member, and an actuator means for driving the front spoiler member between the active position and the retracted position.

Preferably, the actuator means includes means for driving the central portion and ends of the front spoiler member in synchronism with each other so as to hold the latter essentially horizontal during movement between the active and retracted positions.

On the other hand, the guide means comprises a pair first guide assemblies located near center of the front end of the vehicle, each of which includes a first movable member secured to the central portion of the front spoiler member, and a vertically extending first guide member for guiding vertical movement of the corresponding first movable member, and a pair of second guide assemblies located near the lateral edges of the front end of the vehicle, each of which includes a second movable member which is secured to one of the ends of the front spoiler member, and a vertically extending second guide member for guiding vertical movement of the corresponding second movable member. The driving means of the actuator means connects the first and second movable members for synchronous movement thereof.

One of the first guide assemblies is preferably offset slightly to the left of the center of the front end of the vehicle and the other of the first guide assemblies is offset slightly to the right of the center of the front end of the vehicle, and wherein the driving means of the actuator means comprises a first member connecting the first movable member of the leftward-offset first guide means with the second movable member of the right-hand second guide means, a second member connecting the first movable member of the rightward-offset first guide means with the second movable member of the left-hand second guide means, and a third means connecting the pair of the first movable members of the first guide assemblies. The first and second members of the driving means comprise flexible Bowden cables, each of which has a guide inner cable having one end connected to the first movable member and the other end connected to the second movable member, and a stationary outer tube having one end fixed to the first movable member and the other end fixed to the second guide member.

Furthermore, in the preferred embodiment, the third means of the driving means comprises a linking plate extending between the first movable members of the first guide assemblies.

In the alternative embodiment, the driving means comprises a pair of toothed cables driven by a driving pinion driven in turn by a driving motor, and a rigid guide tube covering each of the toothed cables, each of the toothed cables having one end fixed to the first movable member and the other end fixed to the second movable member, and each of the guide tube including one end portion serving as the first guide member and the other end portion serving as the second guide member. The guide tubes are secured to the vehicle body by means of a plurality of mounting brackets.

BRIEF DESCRIPTION OF THE DRAWINGS

In the drawings:

FIGS. 7 and 8 are diagrams of the front end of a vehicle, in which FIG. 7 shows a vehicle with the spoiler device in the active position, and FIG. 8 shows a vehicle with the spoiler device in the retracted position;

DESCRIPTION OF THE PREFERRED EMBODIMENTS

Figure 5:
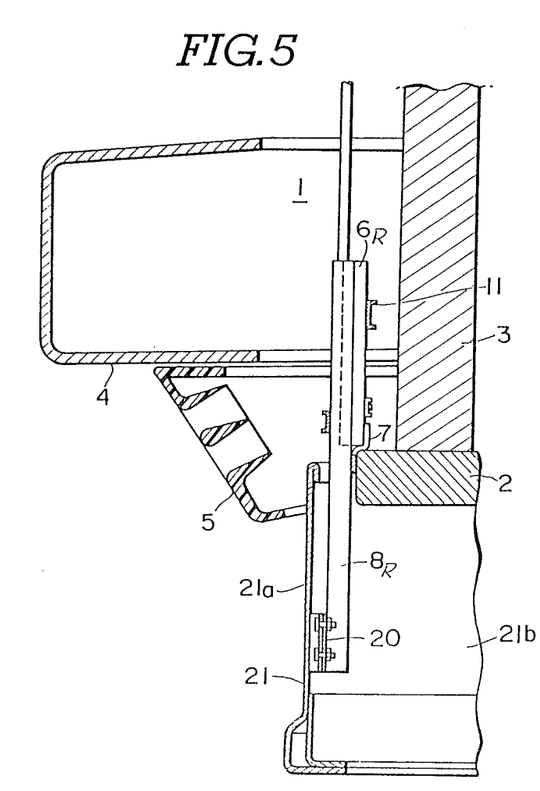
FIGS. 5 and 6 are partial sections through the preferred embodiment of the spoiler device at the active position and at the retracted position, respectively.
Figure 6:
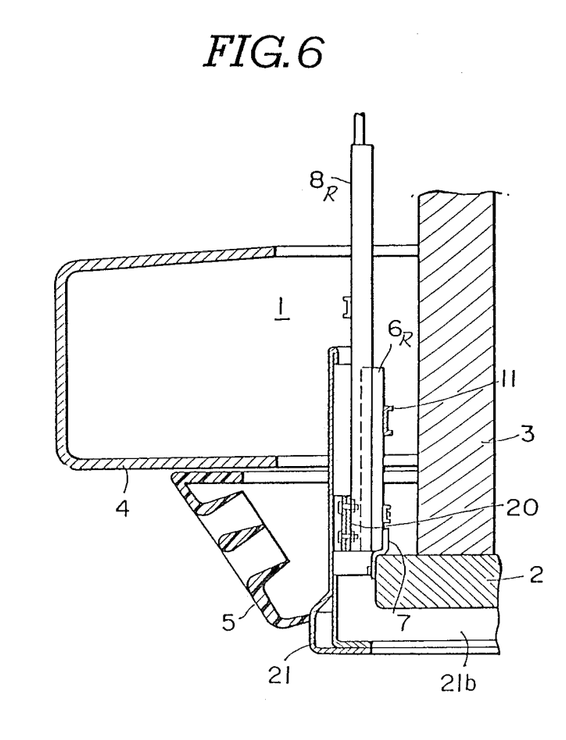

Referring now to the drawings, particularly to FIGS. 1 to 6, the preferred embodiment of a front spoiler device, according to the present invention, is generally supported by a radiator core support 2 which supports a radiator core 3 near the front end of a vehicle body 1, as shown in FIGS. 5 and 6. A front bumper 4 and an apron 5 of per se well-known construction are installed at the front end of the vehicle body.

A pair of vertical stationary guide rails 6L and 6R are secured to the top of the front edge of the radiator core support 2 by means of mounting brackets 7. The guide rails 6L and 6R extend upward and are essentially channel-shaped with outward flanges. Movable rails 8L and 8R are generally channel-shaped with inward flanges slidably engageable with the outward flanges of the guide rails 6L and 6R respectively for vertical movement along the guide rails 6L and 6R. The movable rails 8L and 8R are essentially longer than the guide rails 6L and 6R. In the preferred construction, the movable rails 8L and 8R are approximately twice as long as the guide rails 6L and 6R.

Figure 3:
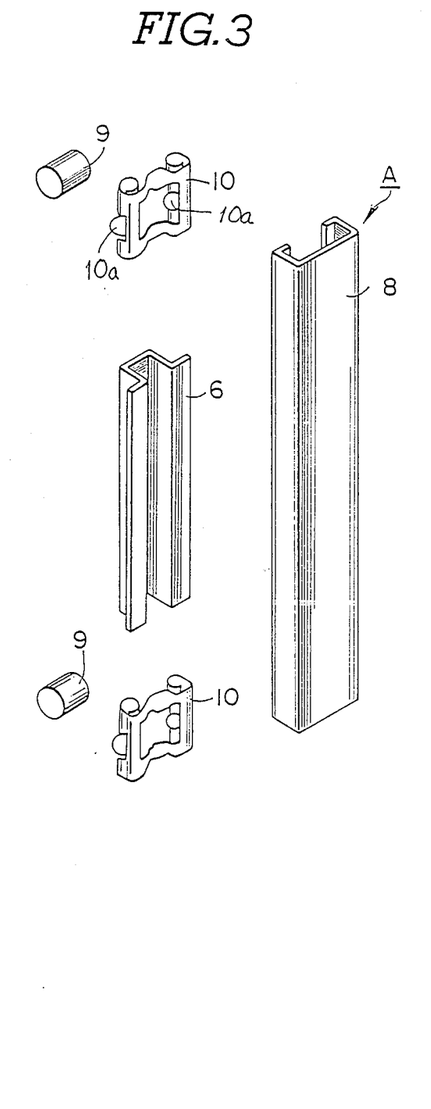
FIG. 3 is an exploded perspective view of a center guide assembly in the preferred embodiment of the spoiler device of FIG. 1.
Figure 4:
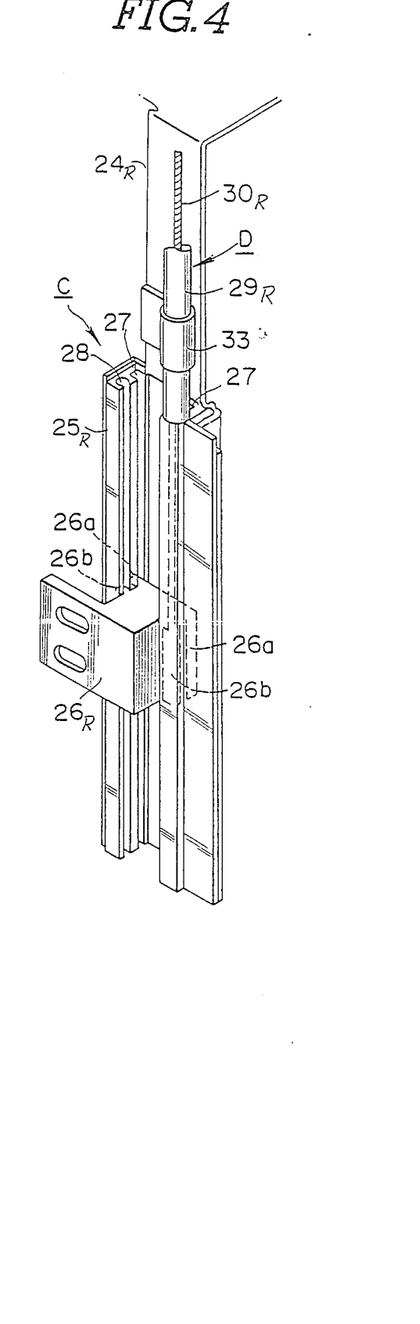
FIG. 4 is a perspective view of a side guide assembly in the preferred embodiment of the spoiler device of FIG. 1.

As shown in FIG. 3, a pair of bearing asemblies, each of which comprises a rotatable roller 9 and a retainer 10, are interposed between the guide rails 6L and 6R and the movable rails 8L and 8R. The retainer 10 also supports a pair of bearing balls 10a. The bearing assemblies assure smooth sliding movement of the movable rails with respect to the guide rails.

Combinations of guide rails 6L and 6R and movable rails 8L and 8R constitute a center guide assembly A for a front spoiler member 21. A transverse member 11 connects the two guide rails 6L and 6R. The ends of the transverse member 11 are secured to the rest faces of the guide rails 6L and 6R. Similarly, a transverse member 12 connects the movable rails 8L and 8R. The ends of the transverse member 12 are fixed to the front faces of the movable rails 8L and 8R. The central section of the transverse member 12 is bent to form a recess receiving a block 14 transpierced by a threaded opening 13. A threaded section of a rotary shaft 15 extends through the threaded opening 13.

A transverse bar member 16 with a forward extending tab lies below and parallel to the transverse member 12. The transverse bar member 16 is supported by the radiator core support 2. The lower end of the rotary shaft 15 is rotatably connected to a bearing assembly 17 which is mounted on the forward tab of the transverse bar member 16. Therefore, the lower end of the rotary shaft 15 can rotate within the bearing asembly 17. On the other hand, the upper end of the rotary shaft 15 is inserted into a gear assembly 18 which is mounted on the transverse member 11. A driven gear (not shown) in the gear assembly 18 is secured to the upper end of the rotary shaft. The driven gear meshes with a driving gear (not shown) driven by a reversible motor 19. With this arrangement, the rotary shaft 15 can be rotated in either direction by the reversible motor 19.

It should be noted that the rotary shaft 15, the block 14, the reversible motor 19 and so forth constitute a lifter mechanism for raising and lowering the front spoiler member 21 according to the operation of the reversible motor. Specifically, when the rotary shaft 15 is driven to rotate in one direction, the block 14 is driven upwards to shift the front spoiler member 21 to a retracted position. This direction of rotation of the rotary shaft and the reversible motor will be hereafter referred to as "spoiler retracting direction". On the other hand, when the reversible motor 19 is driven to drive the rotary shaft 15 in the other direction, the block 14 is shifted downward to move the front spoiler member 21 to an active position. This direction of rotation of the reversible motor 19 and the rotary shaft 15 will be hereafter referred to as "spoiler deploying direction".

Each of the movable rails 8L and 8R has a mounting bracket 20 by which the front spoiler member 21 is fixed to the movable rails 8L and 8R. As seen from FIG. 2, the mounting brackets 20 are secured to the lower front faces of the movable rails 8L and 8R and to the central section of the front spoiler member 21.

The front spoiler member 21 comprises an elongated central major section 21a extending across the entire width of the vehicular front end, and a pair of side sections 21b integral with the major section and extending parallel to the sides of the vehicle body.

A generally channel-shaped brackets 22L or 22R is secured to the rear face of each guide rail 6L or 6R. Similarly, a channel-shaped bracket 23L or 23R is secured to the front face of the each movable rail 8L or 8R. As will be appreciated from FIGS. 1 and 2, the corresponding pair of brackets 22L, 23L and 22R, 23R are vertically offset with respect to each other in such a manner that the brackets 22L and 22R secured to the guide rails 6L and 6R lie below the brackets 23L and 23R secured to the movable rails 8L and 8R. The brackets 22L and 22R will hereafter be referred to as "stationary brackets" and the brackets 23L and 23R will hereafter be referred to as "movable brackets".

The first embodiment of the front spoiler device according to the present invention also comprises a pair of side guide assemblies C. In the shown embodiment, the side guide assemblies are cooperatively associated with the respectively corresponding side sections 21b of the front spoiler member 21 to guide vertical movement of the side sections.

Each of the side guide assemblies comprises a stationary guide rail 25L or 25R which is fixedly secured to the vehicle body by means of a mounting bracket 24L or 24R. The guide rail 25 extends vertically. A movable block 26L (not shown in FIG. 1) or 26R slidingly engages the corresponding guide rail 25L or 25R for sliding movement therealong. As seen from FIG. 4, the guide rail 25R has an axial recess. Mutually opposing a square or rectangular guide grooves 27 are formed in the walls of the recess of the guide rail 25R. The movable block 26R has extensions 26a slidingly engaging the guide grooves 27. Semi-circular grooves 28 are also formed in the wall of the recess of the guide rail 25R next to the square or rectangular grooves 27. Another pair of extensions 26b with cylindrical ends engage the semi-circular grooves.

Each of the movable blocks 26L and 26R is secured to one side section 21b of the front spoiler member 21 through a longitudinal extension 26c thereof.

Each of the side guide assembly C is connected to one center guide A for synchronization with the latter by means of a cooperating means D. Each cooperating means D generally comprises a Bowden cable comprising an outer tube 29L or 29R and an inner cable 30L or 30R. As is well known, the inner cable 30 is movable along the axis of the outer tube 29.

Figure 1:
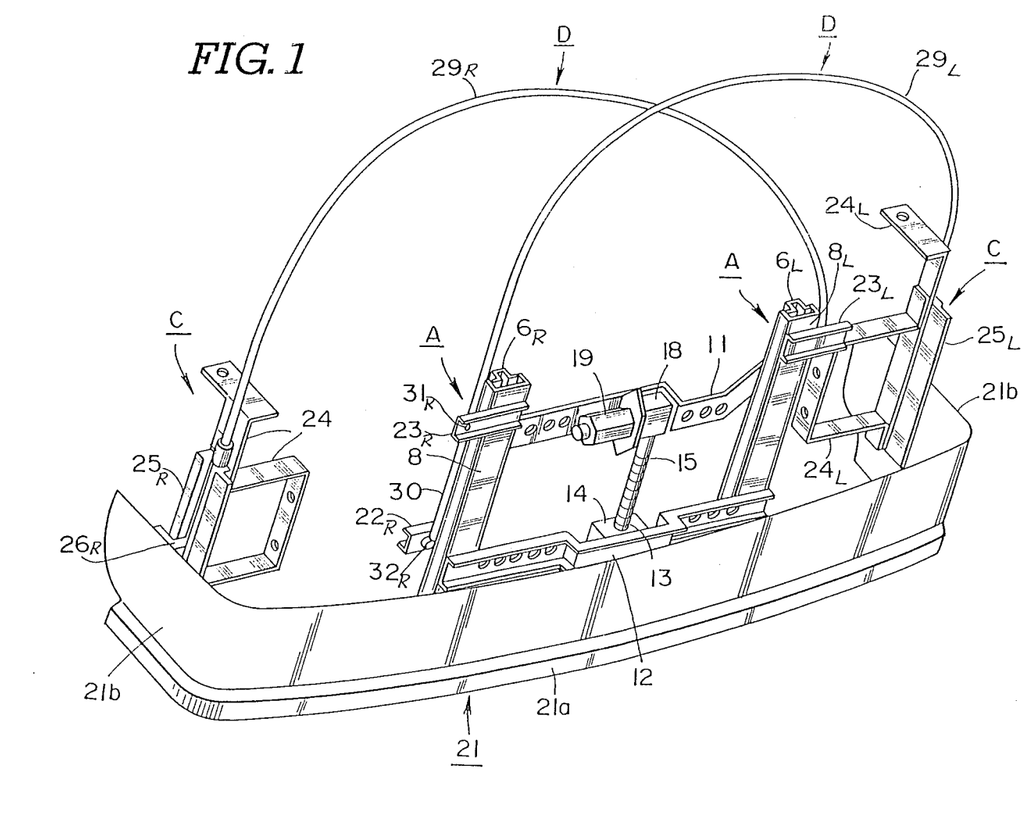
FIG. 1 is a perspective view of the preferred embodiment of a front spoiler device according to the present invention.
Figure 2:
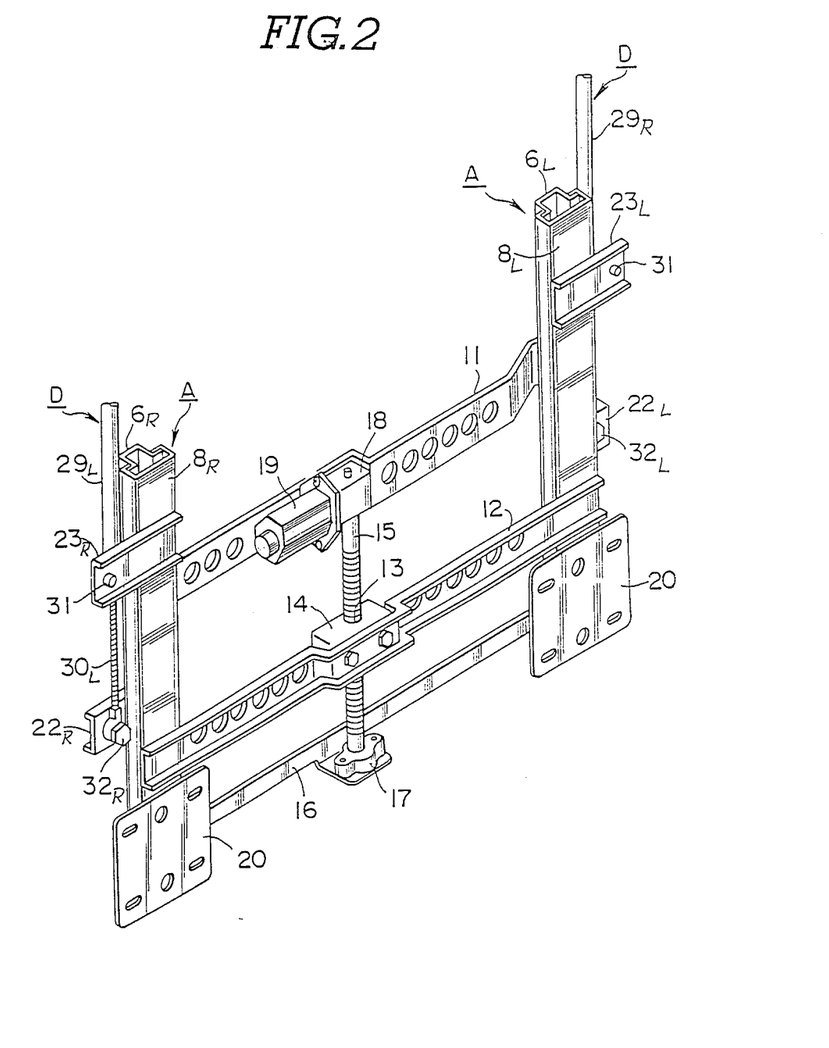
FIG. 2 is an enlarged perspective view of the major part of the preferred embodiment of the spoiler device of FIG. 1.

As best shown in FIG. 1, the inner cable 30L of the Bowden cable is connected at one end to a projection 32R of the bracket 22R secured to the guide rail 6R. The corresponding end of the outer tube 29L of the Bowden cable is secured to the bracket 23R. Therefore, the length of the inner cable 30L outside of the outer tube 29L varies with the relative distance between the brackets 22R and 23R according to the vertical position of the movable rail 8R relative to the guide rail 6R. The other end of the inner cable 30L is connected to the movable block 26L. On the other hand, the corresponding end of the outer tube 29L abuts the top end of the guide rail 25L opposite the groove 28. Therefore, the inner cable 30L extends through the semi-circular groove 28 and is connected to the movable block 26L. The structure of the other cooperating means D is identical to that described above.

It will be appreciated that each inner cable is longer than the outer tube to a given extent. Since the total length of the inne cable outside either end of the outer tube never changes, when the exposed length of the inner cable opposite the bracket 22 varies according to relative displacement between the brackets, the inner cable length within the groove 28 varies inversely. Specifically, as will be seen from FIG. 1, when the movable rails of the center guide assembly A moves upward due to rotation of the rotary shaft in the spoiler retracting direction, the relative distance between the brackets expands. Thus the exposed length of inner cable expands correspondingly. This results in a reduction of the length of the inner cable outside the outer tube at the side guide assembly. This reduction in the exposed length of the inner cable at the side guide assembly results in upward movement of the movable block to an extent matching the upward movement of the movable rail in the center guide assembly. On the other hand, when the movable rail of the center guide assembly A moves downward due to rotation of the rotary shaft in the spoiler deploying direction, the relative distance between the brackets is reduced. As a result, the exposed length of inner cable drops correspondingly. This results in expansion of the length of the inner cable outside the outer tube at the side guide assembly. This results in downward movement of the movable block to an extent matching the downward movement of the movable rail of the center guide assembly.

Figure 7:
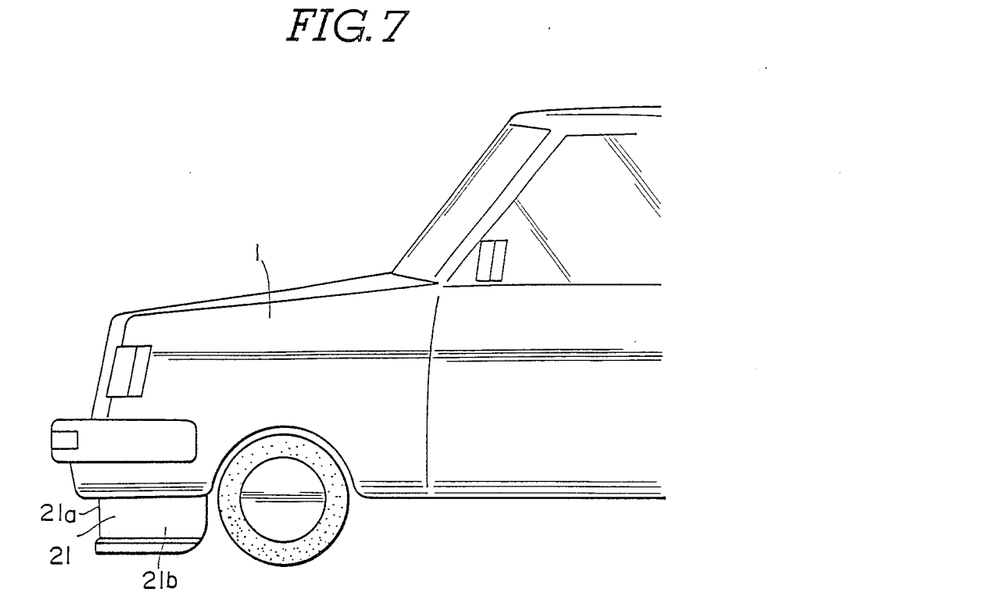

Therefore, in the shown embodiment, when the reversible motor 19 is driven in the spoiler deploying direction, the movable rails 8L and 8R move downward together with the tranverse member 11. Accordingly, the movable blocks 26L and 26R of the side guide assemblies move downward to an extent matching the downward movement of the movable rails. Thus, the central major section 21a and the side sections 21b of the front spoiler member 21 move to the active position together so that the spoiler as a whole remains essentially horizontal as shown in FIG. 7.

Figure 8:
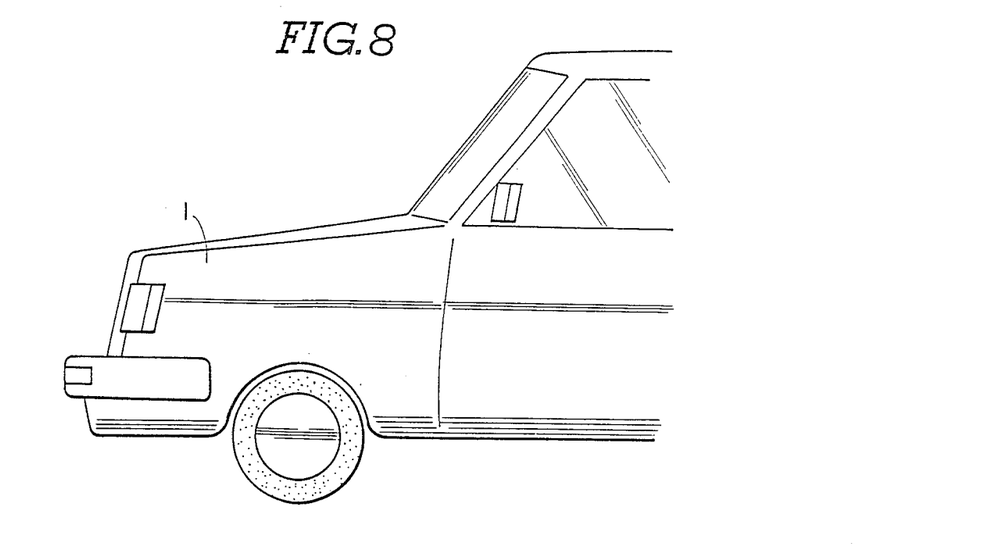

Similarly, when the reversible motor 19 is driven in the spoiler retracting direction, the movable rails 8L and 8R move upward together with the transverse member 11. Accordingly, the movable blocks 26L and 26R of the side guide assemblies move upward to an extent matching the upward movement of the movable rails. Thus, the central major section 21a and the side sections 21b of the front spoiler member 21 can shift to the retracted position together so as to hold the spoiler horizontal, as shown in FIG. 8.

Preferably, a limit switch or limit switches for detecting the upper and lower limit positions of the movable rails 8L and 8R may be provided in the path of the vertical movement thereof. These travel limit switches can effectively prevent the reversible motor from driving the rotary shaft farther than necessary. This would be preferable not only in order to prevent the movable rails and the movable blocks from moving too far, but also to prevent the reversible motor from being overloaded.

Figure 9:
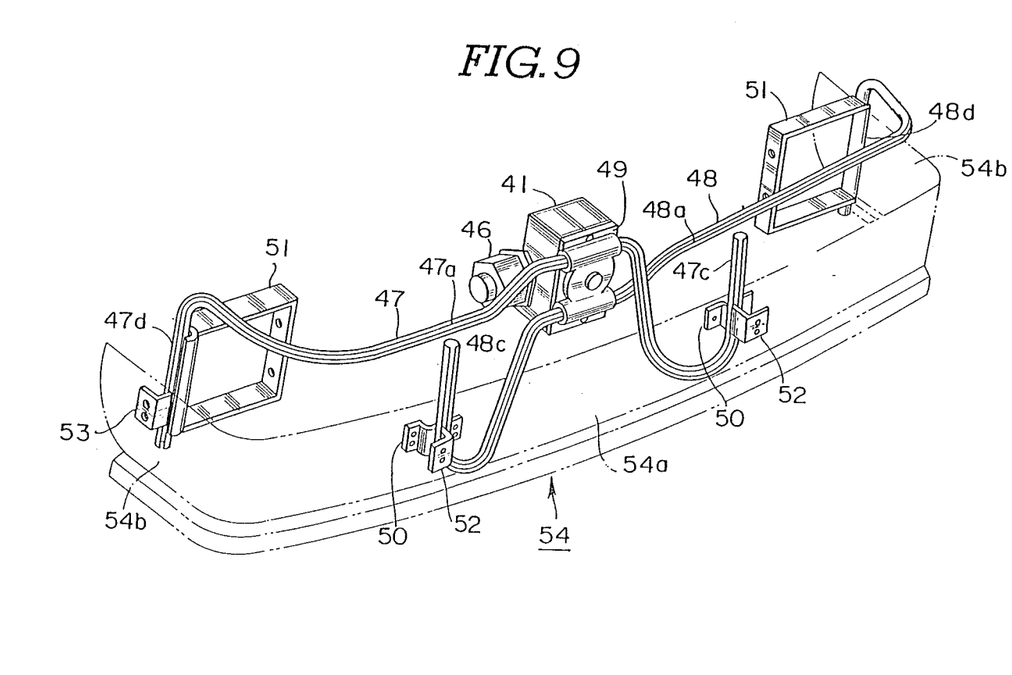
FIG. 9 is a perspective view of a spoiler member lifting mechanism in the second embodiment of a front spoiler device according to the invention.
Figure 10:
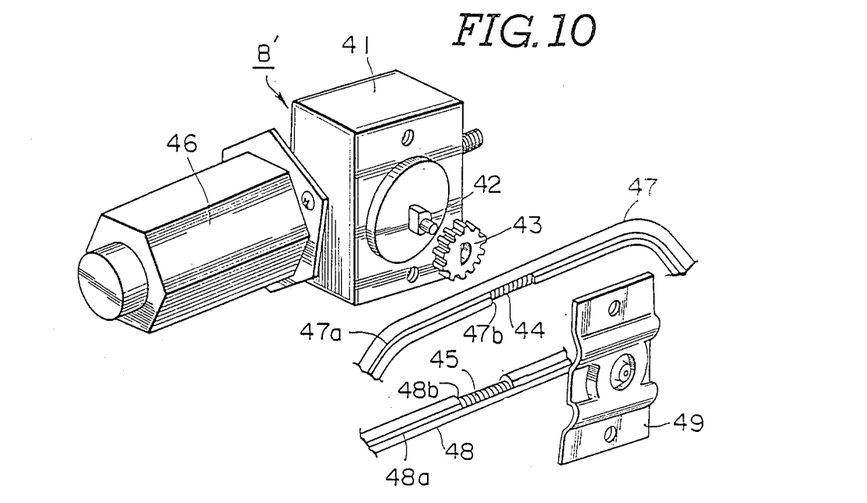
FIG. 10 is an enlarged view of the major parts of the second embodiment of the first spoiler device of FIG. 9.
Figure 11:
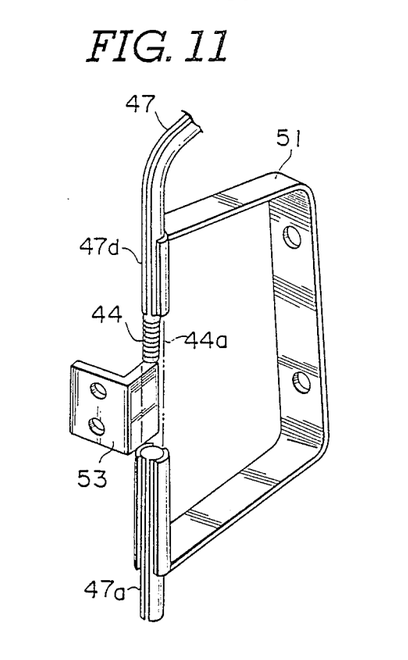
FIG. 11 is an enlarged perspective view of another major part of the second embodiment of the front spoiler device of FIG. 9.

FIGS. 9 to 11 show the second embodiment of a front spoiler device according to the present invention. In this second embodiment, a gear assembly 41 is secured to the radiator core support (not shown). The gear assembly 41 is associated with a reversible motor 46. An output shaft 42 of the gear assembly 41 extends forward from the front face of the gear assembly. A pinion 43 is secured to the output shaft 42 of the gear assembly 41 and is driven by the reversible motor 46 through the gear assembly. The pinion 43 meshes with rack sections of a pair of toothed cables 44 and 45.

The toothed cable 44 engages the pinion 43 from above and the cable 45 engages the pinion 43 from below. As a result, the cables 44 and 45 are driven in mutually opposite directions according to the direction of rotation of the pinion driven by the reversible motor through the gear assembly. This driving engagement between the cables 44 and 45 and the pinion 43 is enforced by a retainer member 49 which is stationarily secured to the housing of the gear assembly.

The toothed cables 44 and 45 are made of a metallic cable core wound spirally with metal cable. The toothed cables 44 and 45 are flexible enough to allowing bending. The toothed cables 44 and 45 are covered by solid guide tubes 47 and 48 which have essentially C-shaped cross-sections and longitudinal slits 47a and 48a. The toothed cables 44 and 45 can move along the axis of the corresponding guide tubes 47 and 48. The guide tube 47 for the toothed cable 44 is formed with a cut-out 47b at the section opposing the pinion 43 so that the pinion 43 engages the toothed cable 44 therethrough. Similarly, the guide tube 48 has a cut-out 48b at a point opposing the pinion 43. Therefore, the pinion 43 can also engage the toothed cable 45.

The guide tube 47 has an upwardly extending vertical end section 47c. As seen from FIG. 9, the vertical end section 47c of the guide tube 47 is offset to the left from the center of the vehicle front end. The outer end section 47d of the guide tube 47 extends downward near the right-hand side section 54b of a spoiler member 54. Similarly, the guide tube 48 has an upwardly extending vertical end section 48c offset to the right from center of the vehicle body, and an downwardly extending outer end section 48d near the left-hand side section 54b of the spoiler.

The guide tubes 47 and 48 may be fixedly secured to the vehicle body by means of retainer brackets 50 and 51. As will be appreciated from FIG. 9, at the central portion, the slits 47a and 48a of the guide tubes 47 and 48 are directed forward and the guide tubes are secured in place on the vehicle body by means of the brackets 50. On the other hand, at the left and right side sections, the guide tubes 47 and 48 are secured to the vehicle body by means of the brackets 51 with the slits 47a and 48a facing outward.

Movable brackets 52 are secured to the vertical end sections 47c and 48c of the toothed cables 44 and 45. The movable brackets 52 extend frontwards through the slits 47a and 48a. Movable brackets 53 are secured to the outer end sections 47d and 48d of the toothed cables 44 and 45. The movable brackets 53 extend outward through the slits 47a and 48a in the guide tubes 47 and 48.

The movable brackets 52 are, in turn, secured to the central section 54a of the front spoiler member 54. On the other hand, the movable brackets 53 are secured to the side sections 54b.

With this arrangement, when the reversible motor is driven in the spoiler deploying direction, the pinion 43 rotates counterclockwise as viewed in FIG. 10. This causes the toothed cable 44 to move to the right, resulting in downward movement of the movable brackets 52 and 53 secured to the toothed cable 44. At the same time, the toothed cable 45 is shifted to the left to cause downward movement of the movable brackets secured thereto.

Therefore, the front spoiler member 54 is shifted downward to the active position. Since the displacement of the movable brackets 52 and 53 is equal and synchronous, the front spoiler member 54 remains essentially horizontal during deployment.

On the other hand, when the reversible motor is driven in the spoiler retracting direction, the pinion 43 rotates clockwise in FIG. 10. This causes the toothed cable 44 to move to the left, resulting in upward movement of the movable brackets 52 and 53 secured to the toothed cable 44. At the same time, the toothed cable 45 is shifted to the right to cause upward movement of the movable brackets secured thereto.

Therefore, the front spoiler member 54 is shifted upward to the retracted position. Since the displacement of the movable brackets 52 and 53 is equal and synchronous, the front spoiler member 54 remains essentially horizontal during retraction.

As will be appreciated herefrom, the front spoiler device according to the present invention fulfills all of the objects and advantages sought therefor.

What is claimed is:

1. A movable front spoiler device for an automotive vehicle comprising:
    an elongated front spoiler member extending along the lower edge of the front end of the vehicle;
    a plurality of guide means, associated with said front spoiler member, for guiding vertical movement of said front spoiler member between an active position wherein said front spoiler member projects downward from the lower edge of the front end of the vehicle, and a retracted position wherein said front spoiler member is retracted behind said front end of the vehicle, at least one of said guide means comprising a central guide means nonpivotally coupled to a central portion of said front spoiler member and being arranged to supportingly guide movement of said front spoiler member at the central portion of said front spoiler member and at least two other guide means nonpivotally coupled to opposite ends of said front spoiler member and being arranged to supportingly guide the opposite ends of said front spoiler member; and
    an actuator means for driving said front spoiler member between said active position and said retracted position, said actuator means being coupled to said guide means for driving said central portion and ends of said front spoiler member in synchronism with each other so as to hold the latter essentially horizontal during movement between said active and retracted positions.

2. A movable front spoiler device as set forth in claim 1, wherein said guide means comprising a pair of first guide assemblies located near center of the front end of the vehicle, each of which includes a first movable member secured to the central portion of said front spoiler member, and a vertically extending first guide member for guiding vertical movement of the corresponding first movable member, and a pair of second guide assemblies located near the lateral edges of the front end of the vehicle, each of which includes a second movable member which is secured to one of the ends of said front spoiler member, and a vertically extending second guide member for guiding vertical movement of the corresponding second movable member 3. A movable front spoiler device as set forth in claim 2, wherein said driving means of said actuator means connects said first and second movable members for synchronous movement thereof.

4. A movable front spoiler device for an automotive vehicle comprising:
    an elongated front spoiler member extending along the lower edge of the front end of the vehicle;
    a plurality of guide means, associated with said front spoiler member, for guiding movement of said front spoiler member between an active position wherein said front spoiler member is projected downward from the lower edge of the front end of the vehicle, and a retracted position wherein said front spoiler member is retracted behind said front end of the vehicle, at least one of said guide means being arranged to supportingly guide movement of said front spoiler member at the central portion of said front spoiler member and at least two other guide means being arranged to supportingly guide the opposite ends of said front spoiler member, said guide means comprising a pair of first guide assemblies located near the center of the front end of the vehicle, each of which includes a first movable member secured to the central portion of said front spoiler member, and a vertically extending first guide member for guiding vertical movement of the corresponding first movable member, and a pair of second guide assemblies located near the lateral edges of the front end of the vehicle, each of which includes a second movable member which is secured to one of the ends of said front spoiler member, and a vertically extending second guide member for guiding vertical movement of the corresponding second movable member, one of said first guide assemblies being offset slightly to the left of the center of the front end of said vehicle and the other of said first guide assemblies being offset slightly to the right of the center of the front end of said vehicle, and said driving means of said actuator means comprising a first member connecting said first movable member of said leftward-offset first guide means with said second movable member of said right-hand second guide means, a second member connecting said first movable member of said rightward-offset first guide means with the second movable member of said left-hand second guide means, and a third means connecting said pair of said first movable members of said first guide assemblies; and an actuator means for driving said front spoiler member between said active position and said retracted position, said actuator means including means for driving said central portion and ends of said front spoiler member in synchronism with each other so as to hold the latter essentially horizontal during movement between said active and retracted positions, said driving means of said actuator means connecting said first and second movable members for synchronous movement thereof.

5. A movable front spoiler device as set forth in claim 4, wherein said first and second members of said driving means comprise flexible Bowden cables, each of which has a movable inner cable having one end connected to said first movable member and the other end conencted to said second guide member, and a stationary outer tube having one end fixed to said first movable member and the other end fixed to said second guide member.

6. A movable front spoiler device as set forth in claim 5, wherein said third means of said driving means comprises a linking plate extending between said first movable members of said first guide assemblies.

7. A movable front spoiler device as set forth in claim 4, wherein said driving means comprises a pair of toothed cables driven by a driving pinion driven in turn by a driving motor, and a rigid guide tube covering each of said toothed cables, each of said toothed cables having one end fixed to said first movable member and the other end fixed to said second movable member, and each of said guide tube including one end portion serving as said first guide member and the other end portion serving as said second guide member.

8. A movable front spoiler device as set forth in claim 7, wherein said guide tubes are secured to the vehicle body by means of a plurality of mounting brackets.

9. A movable front spoiler device for an automotive vehicle comprising:

an elongated front spoiler member extending along the lower edge of the front end of the vehicle;

a plurality of guide means, associated with said front spoiler member, for guiding movement of said front spoiler member between an active position wherein said front spoiler member is projected downward from the lower edge of the front end of the vehicle, and a retracted position wherein said front spoiler member is retracted behind said front end of the vehicle, at least one of said guide means being arranged to supportingly guide movement of said front spoiler member at the central portion of said front spoiler member and at least two other guide means being arranged to supportingly guide the opposite ends of said front spoiler member, said guide means comprising a pair of first guide assemblies located near center of the front end of the vehicle, each of which includes a first movable member secured to the central portion of said front spoiler member, and a vertically extending first guide member for guiding vertical movement of the corresponding first movable member, and a pair of second guide assemblies located near the lateral edges of the front end of the vehicle, each of which includes a second movable member which is secured to one of the ends of said front spoiler member, and a vertically extending second guide member for guiding vertical movement of the corresponding second movable member; and an actuator means for driving said front spoiler member between said active position and said retracted position.

* * * * *